(12) United States Patent
Onda et al.

(10) Patent No.: US 11,333,885 B2
(45) Date of Patent: May 17, 2022

(54) HEAD-UP DISPLAY DEVICE

(71) Applicant: DENSO CORPORATION, Kariya (JP)

(72) Inventors: Kazuhisa Onda, Kariya (JP); Hiroshi Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 376 days.

(21) Appl. No.: 16/697,795

(22) Filed: Nov. 27, 2019

(65) Prior Publication Data

US 2020/0096765 A1 Mar. 26, 2020

Related U.S. Application Data

(63) Continuation of application No. PCT/JP2018/029381, filed on Aug. 6, 2018.

(30) Foreign Application Priority Data

Aug. 7, 2017 (JP) .............................. JP2017-152272

(51) Int. Cl.
*G02B 27/01* (2006.01)
*G02B 5/02* (2006.01)
*B60K 35/00* (2006.01)

(52) U.S. Cl.
CPC ....... *G02B 27/0101* (2013.01); *G02B 5/0215* (2013.01); *G02B 5/0231* (2013.01); *G02B 5/0284* (2013.01); *B60K 35/00* (2013.01); *B60K 2370/1529* (2019.05); *B60K 2370/31* (2019.05)

(58) Field of Classification Search
CPC ............ B60K 35/00; B60K 2370/1529; B60K 2370/31; G02B 26/101; G02B 27/0101; G02B 5/0215; G02B 5/0231; G02B 5/0284; G02B 26/10; G02B 27/01; G02B 5/02

See application file for complete search history.

(56) References Cited

U.S. PATENT DOCUMENTS

| | | | |
|---|---|---|---|
| 2013/0021224 A1 | 1/2013 | Fujikawa et al. | |
| 2014/0071026 A1* | 3/2014 | Hatashita | G02B 5/0215 345/32 |
| 2016/0116735 A1 | 4/2016 | Hayashi et al. | |
| 2016/0320615 A1* | 11/2016 | Nakamura | G02B 27/0101 |
| 2017/0154406 A1* | 6/2017 | Atsuumi | G02B 27/106 |
| 2019/0146237 A1* | 5/2019 | Uchida | G02B 5/10 359/599 |

* cited by examiner

*Primary Examiner* — Stephone B Allen
*Assistant Examiner* — Gabriel A Sanz
(74) *Attorney, Agent, or Firm* — Posz Law Group, PLC (57) ABSTRACT

A light diffusion member constituting a head-up display device includes multiple micro-lenses and has a curved base surface. The edge angle is larger than the base surface angle change amount. The edge angle is an angle formed by one of tangent lines of two micro-lenses and the other of the tangent lines passing through a boundary between two adjacent micro-lenses on a cross section orthogonal to the base surface. A reference line has a constant direction on the cross section, and a normal line passes at an arbitrary position on the base surface. The maximum value is $\theta_{max}$ and the minimum value is $\theta_{min}$ among angles between the normal line and the reference line. The base surface angle change amount is the absolute value of the difference between $\theta_{max}$ and $\theta_{min}$.

7 Claims, 8 Drawing Sheets

HEAD-UP DISPLAY DEVICE

CROSS REFERENCE TO RELATED APPLICATION

The present application is a continuation application of International Patent Application No. PCT/JP2018/029381 filed on Aug. 6, 2018, which designated the U.S. and claims the benefit of priority from Japanese Patent Application No. 2017-152272 filed on Aug. 7, 2017. The entire disclosures of all of the above applications are incorporated herein by reference.

TECHNICAL FIELD

The present disclosure relates to a head-up display device.

BACKGROUND

Conventionally, in an image display device such as a head-up display device, a light diffusion member having a plurality of micro-lenses on a curved surface has been proposed as a means for improving visibility.

SUMMARY

According to an example, a light diffusion member constituting a head-up display device includes multiple micro-lenses and has a curved base surface. The edge angle is larger than the base surface angle change amount. The edge angle is an angle formed by one of tangent lines of two micro-lenses and the other of the tangent lines passing through a boundary between two adjacent micro-lenses on a cross section orthogonal to the base surface. A reference line has a constant direction on the cross section, and a normal line passes at an arbitrary position on the base surface. The maximum value is $\theta_{max}$ and the minimum value is $\theta_{min}$ among angles between the normal line and the reference line. The base surface angle change amount is the absolute value of the difference between $\theta_{max}$ and $\theta_{min}$.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As a result of detailed studies by the inventors, the following difficulties have been found. A light diffusion member having a plurality of micro-lenses on a curved surface has a large gradient in the peripheral portion of the light diffusion member. In particular, the gradient is remarkably large at the edge that is the boundary portion of the micro-lens array. When the light diffusion member is molded with a mold, a portion having a negative gradient may be generated in the light diffusion member in the mold release step. If a portion with a negative gradient is generated in the light diffusion member, the light diffusion member and the mold may interfere with each other, and the shape of the light diffusion member may collapse, so the visibility of the head-up display device may deteriorate.

In one aspect of the present embodiments, it is preferable to provide a head-up display device that improves the visibility by suppressing the collapse of the shape.

One aspect of the present embodiments is a head-up display device configured to project a display image on a display element so that a virtual image of the display image can be viewed from a predetermined view area.

A head-up display device according to one aspect of the present embodiments includes: a laser light emission unit configured to emit laser light; a scan unit configured to scan the laser light emitted from the laser light emission unit; a condenser unit configured to condense the laser light scanned by the scan unit to form a beam; a light diffusion member configured to form a display image when the beam condensed by the condenser unit is incident; and a projection unit configured to project the display image formed on the light diffusion member onto a display element.

The light diffusion member includes a plurality of micro-lenses arranged closely, and has a base surface curved in a convex shape with respect to the projection unit. The edge angle α defined below is larger than the base surface angle change amount θ defined below, and the base surface angle change amount θ is larger than β defined by the following equation (1).

Here, the edge angle α is an angle between one of two tangential lines of two adjacent micro-lenses passing through the boundary K of the two adjacent micro-lenses and the other of the two tangential lines of the two adjacent micro-lenses passing through the boundary K disposed on the cross section orthogonal to the base surface.

Here, a reference line having a constant direction on the cross section is defined as $N_1$, and a normal line at an arbitrary position of the base surface is defined as $N_2$. The maximum value among the angles between the normal line $N_2$ and the reference line $N_1$ is defined as $\theta_{max}$, and the minimum value is defined as $\theta_{min}$. Here, the base surface angle change amount θ is defined as the absolute value of the difference between $θ_{max}$ and $θ_{min}$.

(Mathematical formula 2)

$$\beta = L \times \left( \frac{1}{R_m} + \frac{1}{R_w} - \frac{1}{R_i} \right) \quad \text{Equation (1)}$$

$$\frac{R_i}{D} = 0.1 \sim 0.25 \quad \text{Equation (2)}$$

In the equation (1), L is the size of the light diffusion member. Rm is a mirror curvature radius of the projection unit. Rw is a radius of curvature of the display element. Ri is provided by the following equation (2), and is an allowable value of the field curvature based on physiological knowledge of the eyeball, and D is a distance from the view area to the virtual image.

In the head-up display device that is one aspect of the present embodiments, the edge angle α and the base surface angle change amount θ have the above-described magnitude relationship. Therefore, in any part of the light diffusion member including the periphery of the boundary K, there is a mold release direction (hereinafter referred to as an appropriate mold release direction) in which the draft angle is not negative. As a result, when the mold is released from the light diffusion member, and the release direction is set to an appropriate release direction, the light diffusion member and the mold are unlikely to interfere with each other, and the shape of the light diffusion member is not easily broken.

Here, the reference numerals in parentheses indicate correspondence to the concrete means described in the embodiments, which is an example of the present disclosure. Thus, the technical scope of the present disclosure is not necessarily limited thereto.

Exemplary embodiments will be described with reference to the drawings.

First Embodiment

1. Overall Configuration of the Head-Up Display Device 1

The overall configuration of the head-up display device 1 will be described with reference to FIG. 1. The head-up display device 1 is installed in a dashboard of a vehicle.

The head-up display device 1 includes a laser light emission unit 3, a scanning unit 5, a condensing unit 7, a light diffusion member 9, a projection unit 11, and a dust cover 13.

The laser beam emission unit 3 emits a laser beam Q. The scanning unit 5 is a MEMS scanner. The term MEMS means Micro Electro Mechanical System. The scanning unit 5 is disposed on the optical path of the laser light Q emitted from the laser light emission unit 3. The scanning unit 5 scans the laser beam Q by inclining the mirror surface of the MEMS scanner. By this scanning process, a display image is formed on the light diffusion member 9. The scanning unit 5 is conjugate with a driver's pupil 29 described later.

The condensing unit 7 is an optical element having the effect of a convex lens. The condensing unit 7 is configured by a combination of optical elements such as a convex lens, a concave lens, a convex mirror, and a concave mirror. The condensing unit 7 is disposed on the optical path of the laser light Q scanned by the scanning unit 5. The condensing unit 7 condenses the laser light Q to form a beam B. The condensing unit 7 has a function of forming an image of the beam B on the light diffusion member 9.

The beam B formed by the light condensing unit 7 is incident on the light diffusion member 9. By scanning the beam B, a display image is formed on the light diffusion member 9. The configuration of the light diffusion member 9 will be described later.

The projection unit 11 is configured by a combination of optical elements such as a concave mirror and a convex mirror. The projection unit 11 is disposed on the optical path of the light reflected by the light diffusion member 9 from the beam B. The light reflected by the light diffusion member 9 is the display light I representing a display image formed on the light diffusion member 9. The projection unit 11 projects the display image on the display element 25 by reflecting the display light I in the direction of the display element 25. The display element 25 is a transparent reflecting member such as a windshield. The projection unit 11 has an effect of enlarging the display image. The display image projected on the display element 25 is an image enlarged from the display image on the light diffusion member 9. The dust cover 13 is made of a transparent member. The display light I penetrates the dust cover 13.

When the display element 25 is viewed from the pupil 29 of the driver within the predetermined view area 27, the virtual image 31 of the display image can be viewed in front of the vehicle. The view area means an area where the virtual image 31 can be viewed.

2. Configuration of Light Diffusion Member 9

Figure 3:
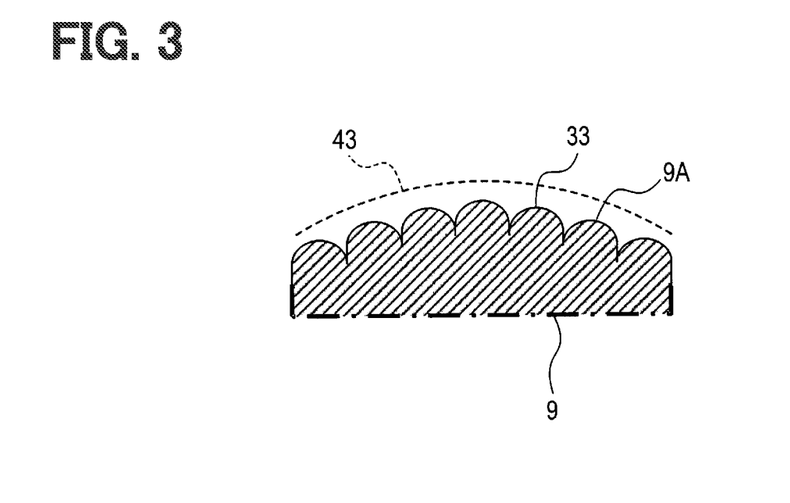
FIG. 3 is a cross-sectional view taken along line III-III in FIG. 2B.
Figure 4:
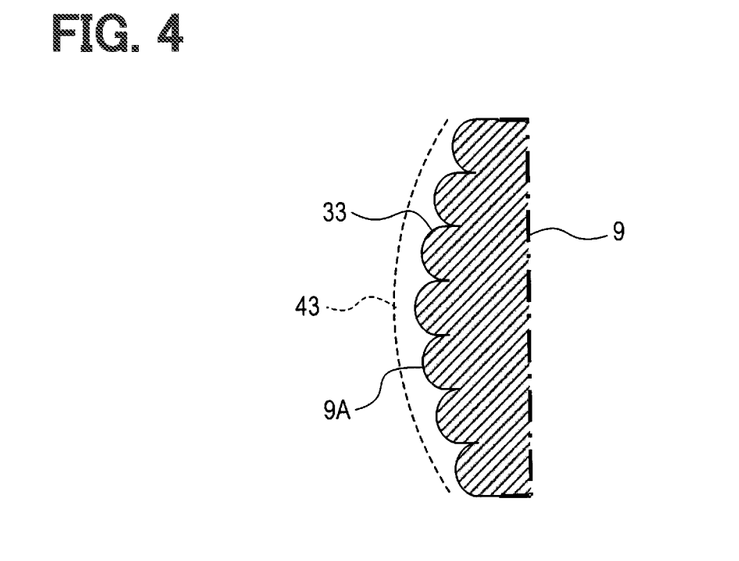
FIG. 4 is a cross-sectional view taken along line IV-IV in FIG. 2B.

The configuration of the light diffusion member 9 will be described with reference to FIGS. 2A to 8. The light diffusion member 9 is a reflective micro-lens array. As shown in FIGS. 2 to 4, a plurality of micro-lenses 33 are closely arranged on the optical surface 9A of the light diffusion member 9. A region P in FIG. 2A is a part of the optical surface 9A.

Figure 1:
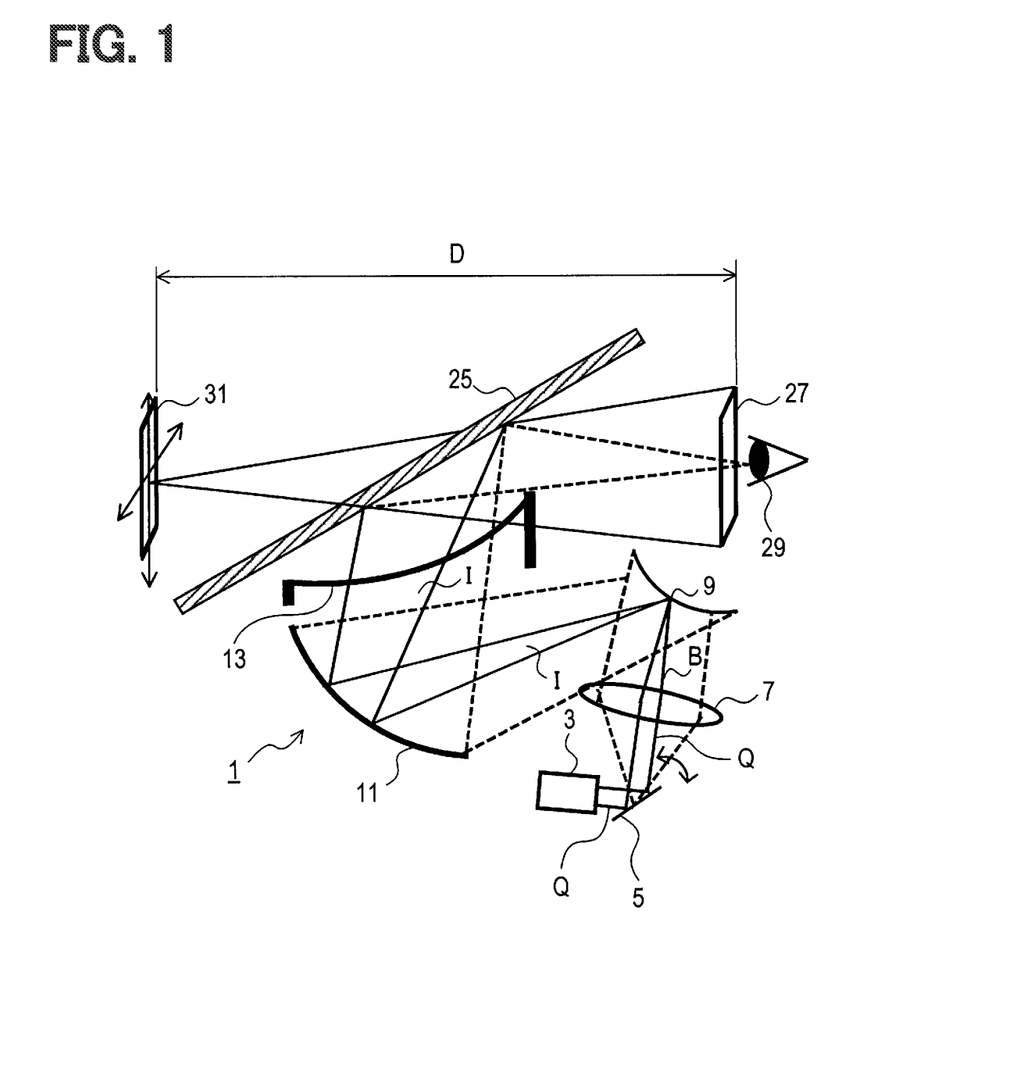
FIG. 1 is an explanatory diagram illustrating an overall configuration of an embodiment of a head-up display device.

As shown in FIGS. 1, 3, and 4, the micro-lens 33 has a convex shape protruding toward the projection unit 11. As shown in FIGS. 2A and 2B, the shape of the micro-lens 33 is a rectangular when viewed from the direction orthogonal to the optical surface 9A. In addition, even when viewed from a direction orthogonal to a base surface 43 described later, the shape of the micro-lens 33 is a rectangle shape. The rectangular corresponds to a polygonal shape.

Figure 2A:
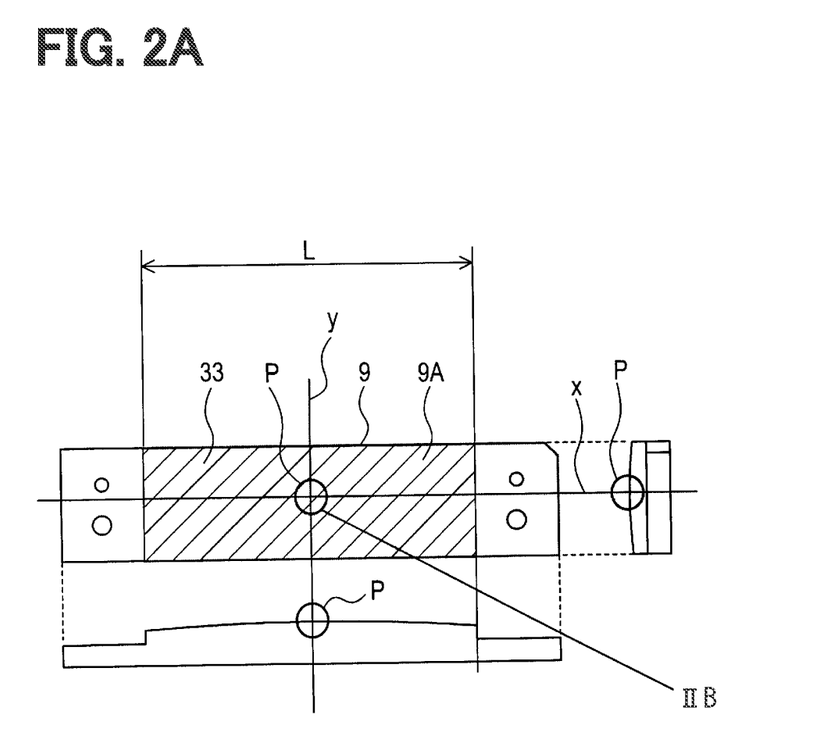
FIG. 2A is a plan view, a side view, and a bottom view showing a configuration of a light diffusion member.
Figure 2B:
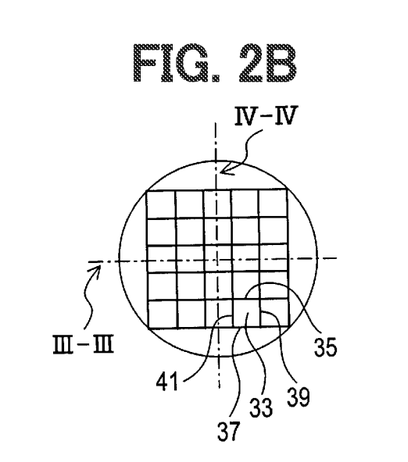
FIG. 2B is a partially enlarged view of a region IIB (i.e., P) in FIG. 2A.

As shown in FIGS. 2A and 2B, the main scanning direction of the beam B on the optical surface 9A is defined as the x direction. The direction orthogonal to the x direction on the optical surface 9A is defined as the y direction. Each micro-lens 33 includes two sides 35 and 37. The two sides 35 and 37 are each parallel to the x direction. The two sides 35 and 37 face each other. Each micro-lens 33 includes two other sides 39 and 41. The two other sides 39 and 41 are each parallel to the y direction. The two other sides 39 and 41 are opposed to each other. The micro-lenses 33 are closely arranged along each of the x direction and the y direction. The close arrangement means that there is substantially no gap between the adjacent micro-lenses 33. The micro-lenses 33 are arranged at substantially equal intervals in the x direction. In addition, the micro-lenses 33 are arranged at substantially equal intervals in the y direction.

As shown in FIGS. 3 and 4, the base surface 43 of the light diffusion member 9 has a curved shape so as to be convex toward the projection unit 11. The base surface 43 means a basic shape on the optical surface 9A on which the shape of each micro-lens 33 is discarded. The optical surface 9A is an outer surface of a convex shape.

As shown in FIG. 3, on a cross section orthogonal to the base surface 43 and parallel to the x direction (hereinafter referred to as cross section x), the base surface 43 is curved so as to be convex toward the projection unit 11. As shown in FIG. 4, even on a cross section orthogonal to the base surface 43 and parallel to the y direction (hereinafter referred to as cross section y), the base surface 43 is curved so as to be convex toward the projection unit 11. In the following, unless otherwise specified, the cross section x and the cross section y are cross sections passing through the center of each arranged micro-lens 33, respectively.

The shape of the base surface 43 on the cross section x and the cross section y is, for example, one of a cylindrical shape, a toroidal shape, a spherical surface, an aspherical surface, and a free curved surface shape.

Figure 5:
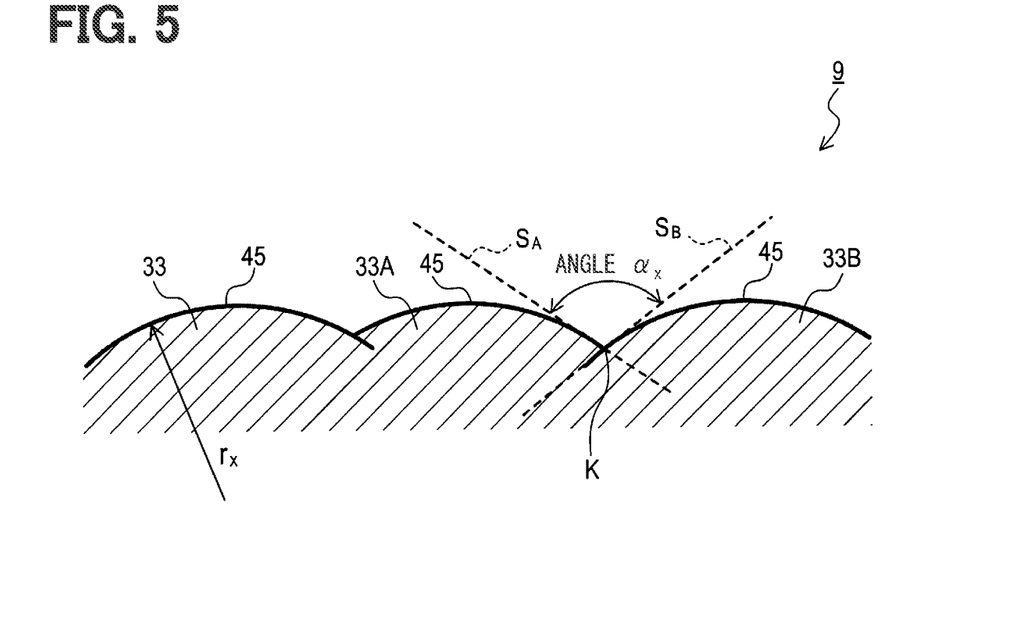
FIG. 5 is a cross-sectional view of a light diffusion member on the cross section x.
Figure 6:
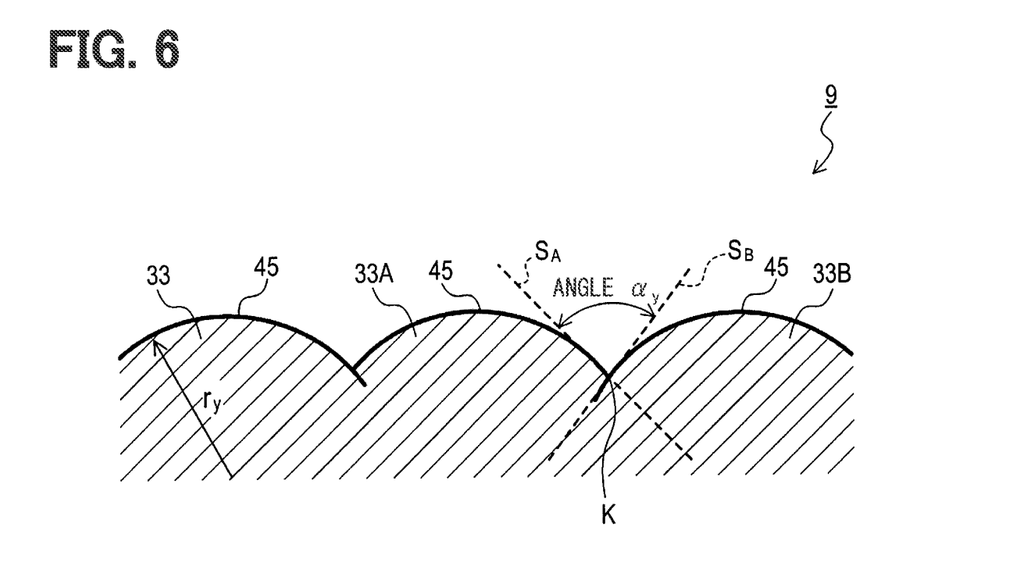
FIG. 6 is a cross-sectional view of the light diffusion member on the cross section y.

As shown in FIG. 5, the radius of curvature of the micro-lens 33 on the cross section x is defined as $r_x$. As shown in FIG. 6, the radius of curvature of the micro-lens 33 on the cross section y is defined as $r_y$. $r_x$ and $r_y$ are different from each other. These configurations have the effect of adjusting the ratio of the long side to the short side of the rectangular view area 27. In any of the micro-lenses 33, $r_x$ is substantially the same. In any of the micro-lenses 33, $r_y$ is substantially the same.

The height of the apex 45 of the micro-lens 33 with respect to the base surface 43 as a standard is the same in any of the micro-lenses 33.

FIG. 5 shows a cross section x. On the cross section x, the boundary between any two adjacent micro-lenses 33A and 33B is represented by K. A tangent line of the micro-lens 33A on the cross section x passing through the boundary K is defined as $S_A$. A tangent line of the micro-lens 33B on the cross section x passing through the boundary K is defined as $S_B$. An angle formed by the tangent line $S_A$ and the tangent line $S_B$ is defined as an edge angle $\alpha_x$. The edge angle $\alpha_x$ is a positive value.

Figure 7:
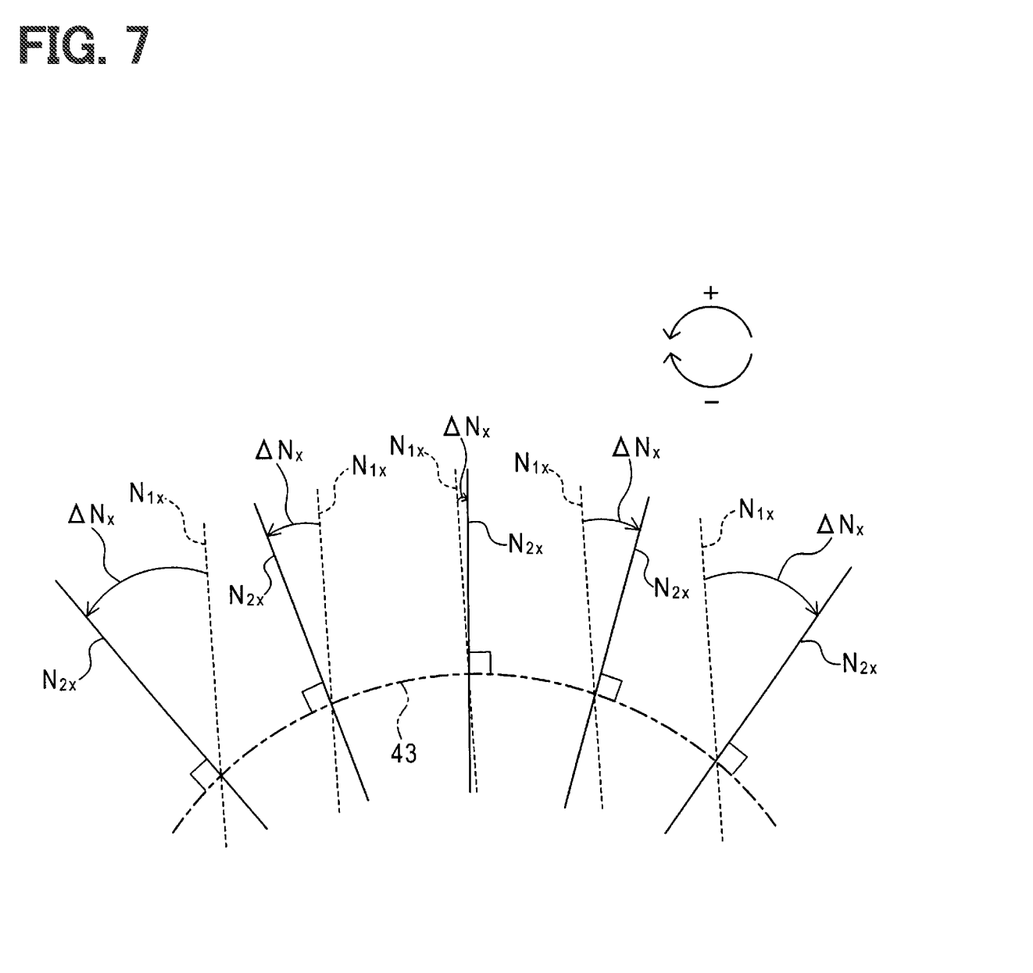
FIG. 7 is an explanatory diagram showing $N_{1x}$, $N_{2x}$, and $\Delta N_x$ on the cross section x.

FIG. 7 shows the same cross section x as FIG. 5. $N_{1x}$ is a reference line that is disposed on the cross section x and the direction of $N_{1x}$ is always constant. $N_{2x}$ is a straight line disposed on the cross section x, and is a normal line at an arbitrary position of the base surface 43. The angle of the normal line $N_{2x}$ with respect to the reference line $N_{1x}$ as a standard is defined as $\Delta N_x$. The angle $\Delta N_x$ is defined for each position on the base surface 43 and is not necessarily constant. On the entire cross section x shown in FIG. 7, the maximum angle $\Delta N_x$ is defined as $\theta_{xmax}$. Further, the minimum angle $\Delta N_x$ on the entire cross section x shown in FIG. 7 is defined as $\theta_{xmin}$. Note that $\theta_{xmax}$ and $\theta_{xmin}$ may be positive values or negative values depending on how the reference line $N_{1x}$ is determined. The absolute value of the difference between $\theta_{xmax}$ and $\theta_{xmin}$ is defined as a base surface angle change amount $\theta_x$. On an arbitrary cross section x, the edge angle $\alpha_x$ at an arbitrary boundary K is larger than the base surface angle change amount $\theta_x$. In FIG. 7, the counterclockwise angle is positive and the clockwise angle is negative.

FIG. 6 shows the cross section y. On the cross section y, the boundary between any two adjacent micro-lenses 33A and 33B is represented by K. A tangent line of the micro-lens 33A on the cross section y passing through the boundary K is defined as $S_A$. A tangent line of the micro-lens 33B on the cross section y passing through the boundary K is defined as $S_B$. An angle formed by the tangent line $S_A$ and the tangent line $S_B$ is defined as an edge angle $\alpha_y$. The edge angle $\alpha_y$ is a positive value.

Figure 8:
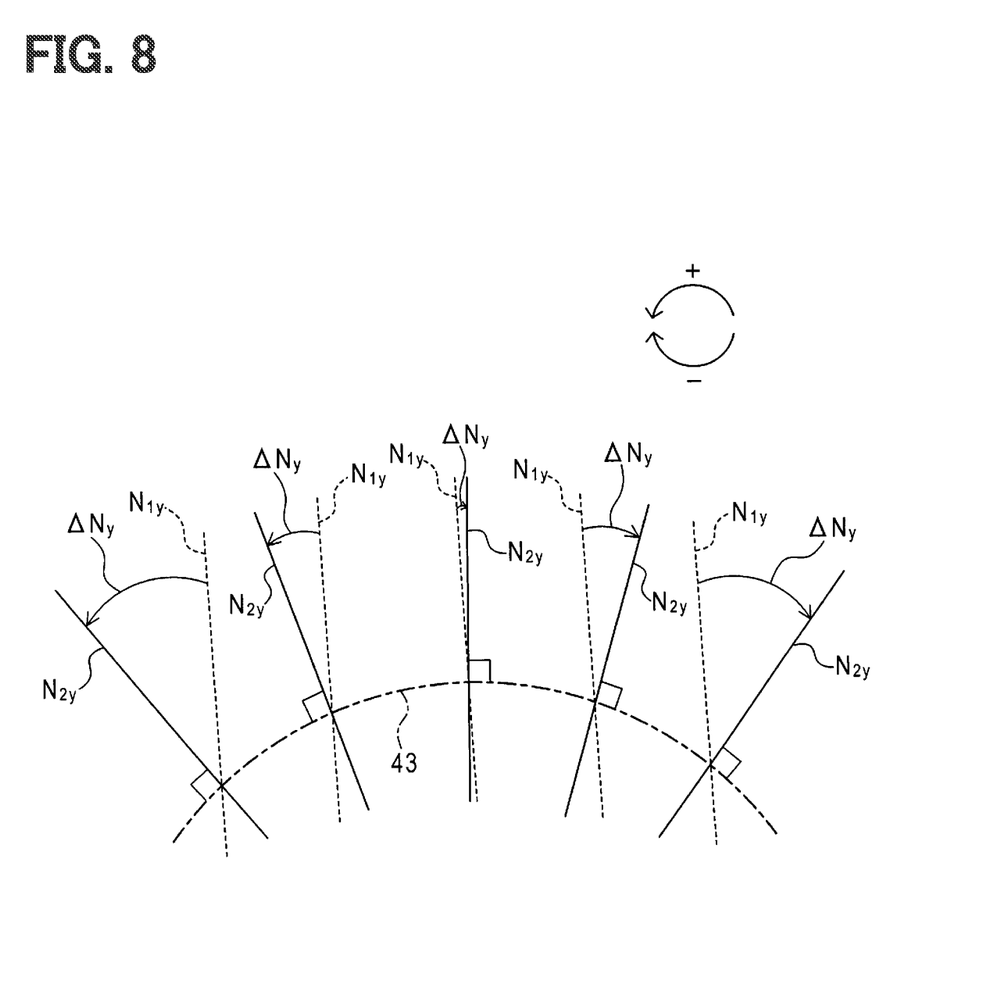
FIG. 8 is an explanatory diagram showing $N_{1y}$, $N_{2y}$, and $\Delta N_y$ on the cross section y.

FIG. 8 shows the same cross section y as FIG. 6. $N_{1y}$ is a reference line disposed on the cross section y and having a constant direction. $N_{2y}$ is a straight line disposed on the cross section y, and is a normal line at an arbitrary position of the base surface 43. The angle of the normal line $N_{2y}$ relative to the reference line $N_{1y}$ as a standard is defined as $\Delta N_y$. The angle $\Delta N_y$ is defined for each position on the base surface 43 and is not necessarily constant. On the entire cross section y shown in FIG. 8, the maximum angle $\Delta N_y$ is defined as $\theta_{ymax}$. Also, the minimum angle $\Delta N_y$ on the entire cross section y shown in FIG. 8 is defined as $\theta_{ymin}$. Note that $\theta_{ymax}$ and $\theta_{ymin}$ may be positive values or negative values depending on how the reference line $N_{1y}$ is determined. The absolute value of the difference between $\theta_{ymax}$ and $\theta_{ymin}$ is defined as a base surface angle change amount $\theta_y$. On an arbitrary cross section y, the edge angle $\alpha_y$ at an arbitrary boundary K is larger than the base surface angle change amount $\theta_y$. In FIG. 8, the counterclockwise angle is positive and the clockwise angle is negative.

On any cross section x, the base surface angle change amount $\theta_x$ is larger than $\beta_x$ defined by the following equation (1x). In the equation (1x), Lx is the size of the light diffusion member 9 in the x direction. $R_{mx}$ is the imaging mirror curvature radius in the x direction. $R_{Wx}$ is a radius of curvature of the display element 25 in the x direction. $R_i$ is an allowable value of field curvature based on physiological knowledge of the eyeball represented by the following formula (2x). D is the distance from the view area 27 to the virtual image 31.

On an arbitrary cross section y, the base surface angle change amount $\theta_y$ is larger than $\beta_y$ defined by the following equation (1y). In the equation (1y), Ly is the size of the light diffusion member 9 in the y direction. $R_{my}$ is an imaging mirror radius of curvature in the y direction. $R_{Wy}$ is a radius of curvature of the display element 25 in the y direction. $R_i$ is an allowable value of field curvature based on physiological knowledge of the eyeball represented by the following formula (2y). D is the distance from the view area 27 to the virtual image 31.

[Mathematical formula 1]

$$\beta_x = L_x \times \left( \frac{1}{R_{mx}} + \frac{1}{R_{wx}} - \frac{1}{R_i} \right) \qquad \text{Equation (1x)}$$

$$\beta_y = L_y \times \left( \frac{1}{R_{my}} + \frac{1}{R_{wy}} - \frac{1}{R_i} \right) \qquad \text{Equation (1y)}$$

$$\frac{R_i}{D} = 0.1 \sim 0.25 \qquad \text{Equation (2x)}$$

$$\frac{R_i}{D} = 0.1 \sim 0.25 \qquad \text{Equation (2y)}$$

The light diffusion member 9 is made of resin. Examples of resin include polycarbonate, acrylic, and cycloolefin polymer. Examples of cycloolefin polymer include those represented by COP and those represented by COC.

The light diffusion member 9 may be manufactured using a mold. As a method of manufacturing using a mold, for example, injection molding or the like may be applied. When manufacturing the light diffusion member 9 using a mold, there exists a process of releasing a mold from the light diffusion member 9 which is a molded product. The mold removing direction with respect to the light diffusion member 9 when the mold is released from the light diffusion member 9 is defined as a mold releasing direction.

3. Effects Exhibited by the Light Diffusion Member 9 and the Head-Up Display Device 1

(1A) In the light diffusion member 9, the edge angle $\alpha_x$ and the base surface angle change amount $\theta_x$ have the above-described magnitude relationship, and the edge angle $\alpha_y$ and the base surface angle change amount $\theta_y$ have the above-described magnitude relationship.

Therefore, even if the light diffusion member 9 has a curved shape, there exists an appropriate mold release direction in which the draft angle is not negative in any part of the light diffusion member 9 including the periphery of the boundary K. As a result, when the mold is released from the light diffusion member, and the release direction is set to an appropriate release direction, the light diffusion member and the mold are unlikely to interfere with each other, and the shape of the light diffusion member is not easily broken. In particular, the shape of the micro-lens 33 is difficult to collapse. Further, the visibility of the head-up display device 1 is improved because the shape of the micro-lens 33 is not easily collapsed.

The edge angle $\alpha_x$ is preferably at least three times larger than the base surface angle change amount $\theta_x$. The edge angle $\alpha_y$ is preferably at least three times larger than the base surface angle change amount $\theta_y$. In this case, when the mold is released from the light diffusion member 9, the shape of the light diffusion member 9 is more difficult to collapse.

(1B) The shape of the base surface 43 is any one of a cylindrical shape, a toroidal shape, a spherical surface, an aspherical surface, and a free curved surface shape. Therefore, the visibility is much higher than in the case of other shapes.

(1C) The light diffusion member 9 is made of resin. Therefore, it is easy to manufacture the light diffusion member 9 using a mold.

(1D) The light diffusion member 9 is a reflective light diffusing member. Compared to a transmissive light diffusing member, stray light is less likely to be generated, and visibility is much higher.

(1E) The micro-lens 33 has a convex shape with respect to the projection unit 11. Compared with the case where the micro-lens 33 is a concave lens, the edge shape at the boundary of the micro-lens array is less likely to collapse.

(1F) The shape of the micro-lens 33 viewed from a direction orthogonal to the base surface 43 is a polygon. Therefore, the eye box shape may be easily adjusted as compared with the case of other shapes.

(1G) The base surface angle change amount $\theta_x$ is larger than $\beta_x$. Further, the base surface angle change amount $\theta_y$ is larger than $\beta_y$. Therefore, the curvature of field may be suppressed and the visibility can be improved.

Other Embodiments

While the embodiment of the present disclosure has been described, the present disclosure is not limited to the embodiment described above and can be modified in various manners.

Figure 9:
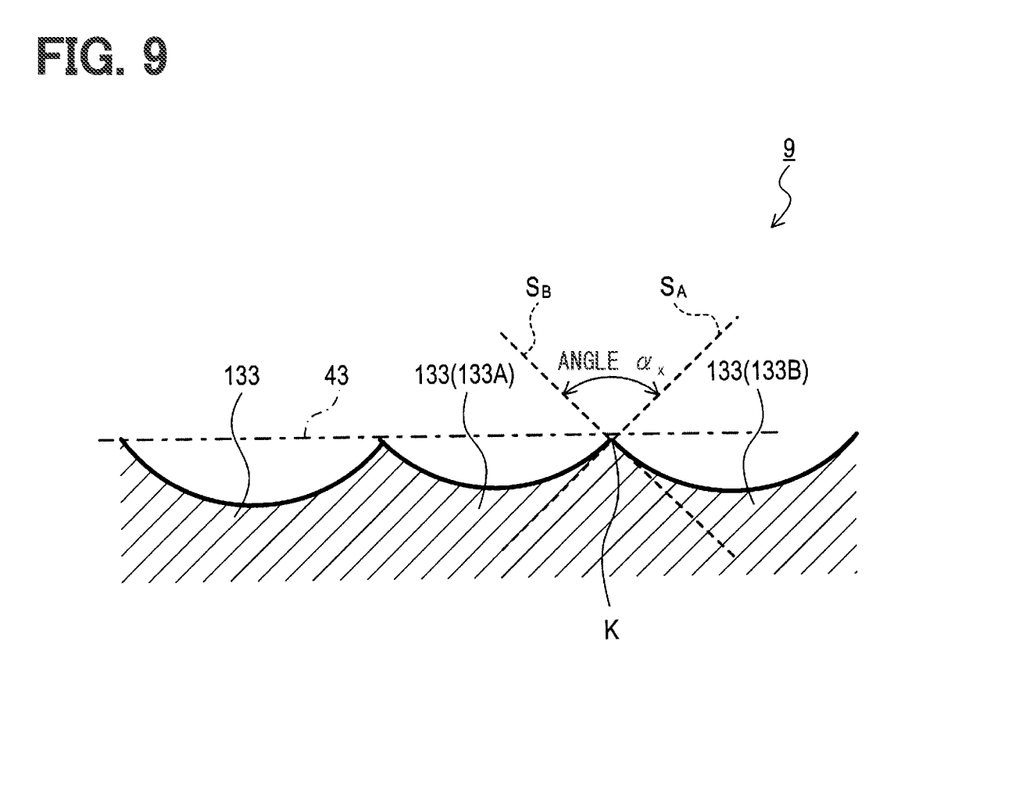
FIG. 9 is a cross-sectional view taken along the cross section x representing a light diffusion member having a concave micro-lens.

(1) As shown in FIG. 9, the light diffusion member 9 may include a concave micro-lens 133. FIG. 9 shows a cross section x. On this cross section x, the boundary between any two adjacent micro-mirrors 133A, 133B is represented by K. A tangent line of the micro-mirror 133A on the cross section x passing through the boundary K is defined as $S_A$. A tangent line of the micro-mirror 133B on the cross section x passing through the boundary K is defined as $S_B$. An angle formed by the tangent line $S_A$ and the tangent line $S_B$ is defined as an edge angle $\alpha_x$. The edge angle $\alpha_x$ is a positive value. Similarly, the edge angle $\alpha_y$ may be defined on the cross section y.

(2) The shape of the micro-lens 33 viewed from the direction orthogonal to the base surface 43 may be a polygon other than a quadrangle. The shape of the micro-lens 33 may be, for example, a triangle, or may be a hexagon as shown in FIG. 11.

Figure 11:
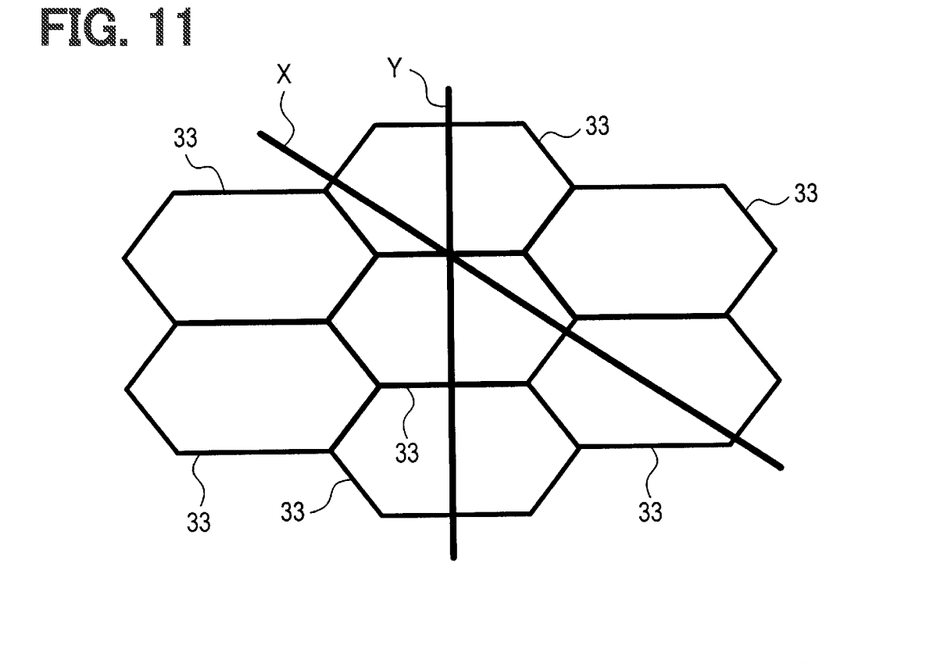
FIG. 11 is a plan view showing a light diffusion member including a micro-lens having a hexagonal shape when viewed from a direction orthogonal to a base surface.

As shown in FIG. 11, there are an cross section x and a cross section y as cross sections orthogonal to the base surface 43 and along the arrangement direction of the micro-lenses 33. Similarly to the first embodiment, the edge angle $\alpha$ and the base surface angle change amount $\theta$ may be calculated on the cross section x and the cross section y. On both the cross section x and the cross section y, the edge angle $\alpha$ is larger than the base surface angle change amount $\theta$. Therefore, the effect (1A) may be achieved.

Further, for example, on any of the cross section x and the cross section y, the base surface angle change amount $\theta$ may be larger than $\beta$ calculated in the same manner as the equations (1x) and (1y). In this case, the effect (1G) may be achieved.

Figure 12:
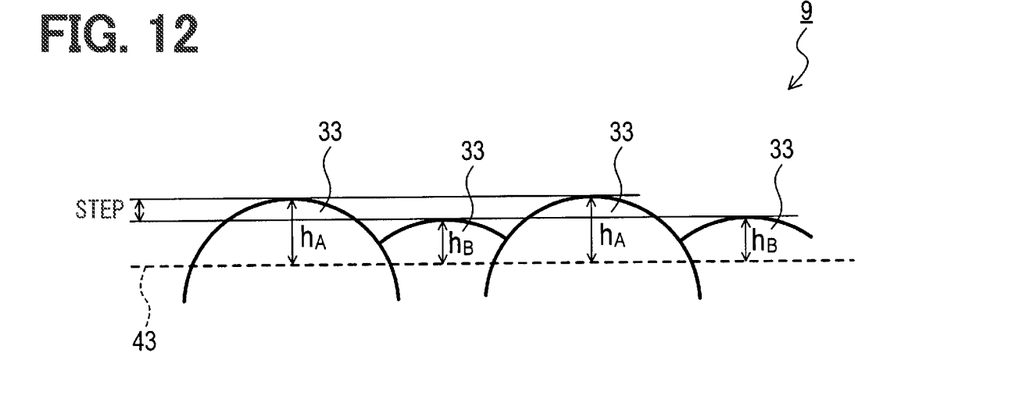
FIG. 12 is a cross-sectional view taken along an cross section s showing a light diffusion member having a micro-lens with a non-constant height.

(3) As shown in FIG. 12, the height of the micro-lens 33 may not be constant. The height of the micro-lens 33 means a height with respect to the base surface 43. FIG. 12 represents the cross section x. For example, as shown in FIG. 12, the micro-lenses 33 having a height $h_A$ and the micro-lenses 33 having a height $h_B$ may be alternately arranged. $h_A$ is greater than $h_B$. In this case, a step is generated between the apexes of the adjacent micro-lenses 33. In the case of the above-described configuration, the visibility is further higher than the case where the height of the micro-lens 33 is constant.

Figure 10:
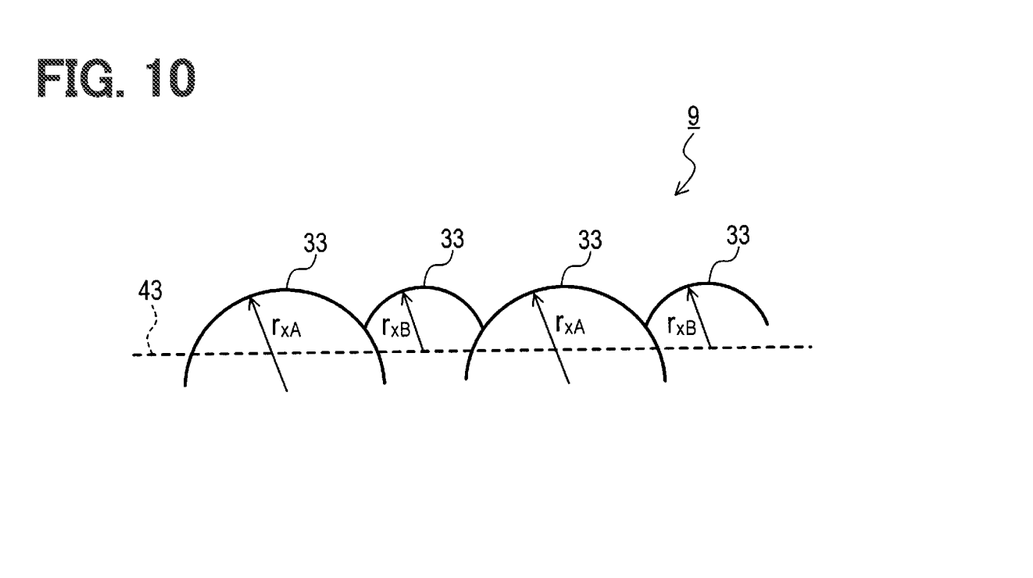
FIG. 10 is a cross-sectional view taken along the cross section x of a light diffusion member having a micro-lens with a non-constant curvature radius.

(4) As shown in FIG. 10, the curvature radius of the micro-lens 33 may not be constant. FIG. 10 represents the cross section x. For example, the radius of curvature of the micro-lens 33 may be two types, $r_{xA}$ and $r_{xB}$. The micro-lens 33 having $r_{xB}$ as the radius of curvature is lower in height and smaller in curvature radius than the micro-lens 33 having $r_{xA}$ as the radius of curvature. In the x direction, the micro-lens 33 having the curvature radius $r_{xA}$ and the micro-lens 33 having the curvature radius $r_{xB}$ may be alternately arranged.

Similarly, in the y direction, the micro-lenses 33 having a large radius of curvature and the micro-lenses 33 having a small radius of curvature may be alternately arranged.

In the case of the above-described embodiment, it is excellent in that the visibility can be improved by suppressing the change in the view area according to the height variation of the micro-lens as compared with the case where the curvature radius of the micro-lens 33 is constant.

(5) The light diffusion member 9 may be a transmissive light diffusing member.

(6) An image display device other than the head-up display device may include the light diffusion member 9.

Figure 13:
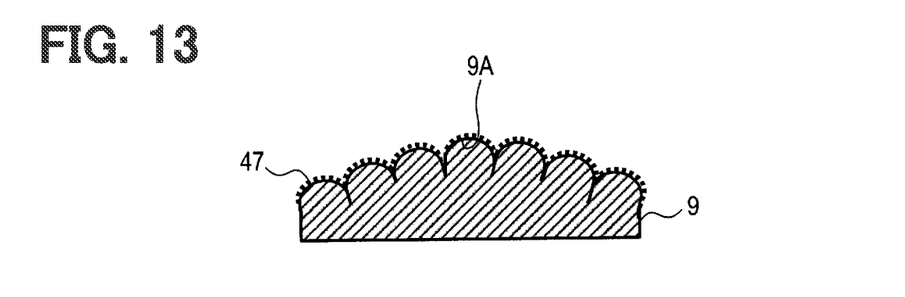
FIG. 13 is a cross-sectional view showing a light diffusion member having a reflective film on an optical surface.

(7) As shown in FIG. 13, a reflective film 47 may be arranged on the optical surface 9A of the light diffusion member 9. The reflective film 47 improves the intensity of reflected light. Examples of the material of the reflective film 47 include aluminum and a dielectric material.

(8) A plurality of functions of one constituent element in the above embodiment may be realized by a plurality of constituent elements, or a single function of one constituent element may be realized by a plurality of constituent elements. Further, multiple functions of multiple elements may be implemented by one element, or one function implemented by multiple elements may be implemented by one element. A part of the configuration of the above embodiments may be omitted. At least a part of the configuration of the above embodiments may be added to or replaced with another configuration of the above embodiments. All features included in the technical idea identified by the wording correspond to embodiments of the present disclosure.

(9) In addition to the head-up display device described above, the present disclosure can be realized in various forms such as a light diffusion member, an optical system including the light diffusion member as a constituent element, and an image display method.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A head-up display device configured to make a virtual image of a display image to be visible from a predetermined view area by projecting the display image on a display element, the head-up display device comprising:
a laser light emission unit configured to emit a laser light;
a scanning unit configured to scan the laser light emitted by the laser light emission unit;
a condensing unit configured to condense the laser light scanned by the scanning unit to form a beam;
a light diffusion member configured to form the display image when the beam formed by the light condensing unit is incident;
a projection unit configured to project the display image formed by the light diffusion member onto the display element, wherein:
the light diffusion member includes a plurality of micro-lenses arranged closely, and has a base surface curved in a convex shape with respect to the projection unit;
an edge angle α is larger than a base surface angle change amount θ;
the base surface angle change amount is larger than β defined by a Equation (1);
the edge angle is an angle between one of two tangential lines of two adjacent micro-lenses passing through a boundary of the two adjacent micro-lenses and an other of the two tangential lines of the two adjacent micro-lenses passing through the boundary disposed on a cross section orthogonal to the base surface;
a reference line having a constant direction on the cross section is defined as $N_1$, and a normal line at an arbitrary position of the base surface is defined as $N_2$;
a maximum value among angles between the normal line and the reference line is defined as $\theta_{max}$, and a minimum value is defined as $\theta_{min}$;
the base surface angle change amount is defined as an absolute value of a difference between $\theta_{max}$ and $\theta_{min}$;

$$\beta = L \times \left( \frac{1}{R_m} + \frac{1}{R_w} - \frac{1}{R_i} \right) \quad \text{Equation (1)}$$

$$\frac{R_i}{D} = 0.1 \sim 0.25 \quad \text{Equation (2)}$$

in the Equation (1), L is a size of the light diffusion member;
Rm is a mirror curvature radius of the projection unit;
Rw is a radius of curvature of the display element; and
Ri is provided by the Equation (2), and is an allowable value of a field curvature based on physiological knowledge of an eyeball, and D is a distance from the view area to the virtual image.

2. The head-up display device according to claim 1, wherein:
a shape of the base surface is one of a cylindrical shape, a toroidal shape, a spherical surface, an aspherical surface, and a free curved surface shape.

3. The head-up display device according to claim 1, wherein:
the light diffusion member is made of resin.

4. The head-up display device according to claim 1, wherein:
the light diffusing member is a reflection type light diffusion member.

5. The head-up display device according to claim 1, wherein:
each of the micro-lenses has a convex shape with respect to the projection unit.

6. The head-up display device according to claim 1, wherein:
the edge angle is three times or more larger than the base surface angle change amount.

7. The head-up display device according to claim 1, wherein:
a shape of each of the micro-lenses viewed from a direction orthogonal to the base surface is a polygon.

* * * * *